United States Patent [19]

Tsuji et al.

[11] Patent Number: 4,859,531
[45] Date of Patent: Aug. 22, 1989

[54] METHOD FOR BONDING A CUBIC BORON NITRIDE SINTERED COMPACT

[75] Inventors: Kazuwo Tsuji; Hitoshi Sumiya; Yoshiaki Kumazawa; Nobuo Urakawa; Keiichi Satoh, all of Hyogo, Japan

[73] Assignee: Sumitomo Electric Industries, Ltd., Osaka, Japan

[21] Appl. No.: 224,930

[22] Filed: Jul. 27, 1988

[30] Foreign Application Priority Data

Jul. 29, 1987 [JP] Japan ................................. 62-189649
Jul. 30, 1987 [JP] Japan ................................. 62-191285
Nov. 6, 1987 [JP] Japan ................................. 62-281762

[51] Int. Cl.⁴ .......................................... B32B 31/06
[52] U.S. Cl. ...................................... 428/333; 156/89; 228/121; 228/263.12; 228/263.21; 264/332; 428/457; 428/627; 428/698; 428/701
[58] Field of Search .................. 156/89; 264/60, 65, 264/320, 325, 332, 102; 428/697, 698, 699, 700, 701, 457, 552, 565, 627, 661, 675, 472, 333; 51/207, 307, 309; 228/121, 122, 124, 263.12, 263.21

[56] References Cited

U.S. PATENT DOCUMENTS

3,918,219 11/1975 Wentorf et al. ................. 264/332
4,729,504 3/1988 Edamura ........................... 228/122

FOREIGN PATENT DOCUMENTS

587622 11/1959 Canada ..................... 156/89
878032 9/1961 United Kingdom .

OTHER PUBLICATIONS

Chemical Abstracts, (vol. 105, 1986, p. 288) 105:17523g Composite brazes. by Kozo Kashiwagi, (Tanaka Noble Metal Industrial Co., Ltd.).

*Primary Examiner*—Caleb Weston
*Attorney, Agent, or Firm*—W. G. Fasse; D. H. Kane, Jr.

[57] ABSTRACT

A method for bonding a cubic boron nitride sintered compact to other cubic boron nitride sintered compact or to a body of shank material is disclosed. The method comprises forming a Ti layer of 0.01–1 μm in thickness over a bonding interface between two cubic boron nitride sintered compacts or between a cubic boron nitride sintered compact and a body of shank material, forming a layer of Ni or Cu over the Ti layer to a thickness of 0.01–5 μn, putting together the two cubic boron nitride sintered compacts or the cubic boron nitride sintered compact and the body of shank material with a 10–1,000 μm foil of Al, Al-Ni alloy or Ag—Cu—In alloy being placed over the boding interface, and heating the cubic boron nitride sintered compact structure to temperatures above the meeting point of the metal foil and not exceeding 750° C. in an inert atmosphere or in a vacuum.

15 Claims, 1 Drawing Sheet

U.S. Patent Aug. 22, 1989 4,859,531
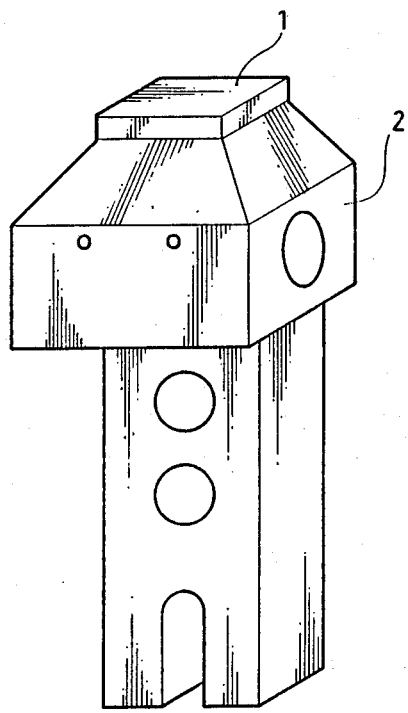

METHOD FOR BONDING A CUBIC BORON NITRIDE SINTERED COMPACT

BACKGROUND OF THE INVENTION

1. Field of the Invention

This invention relates to a method for bonding a cubic boron nitride sintered compact, and in particular to a novel method for bonding a cubic boron nitride sintered compact to another cubic boron nitride sintered compact or to a body of shank material at temperatures in the neighborhood of 750° C.

2. Description of the Prior Art

A cubic boron nitride sintered compact, hereinafter also referred to as cBN sintered compact, has a wide range of potential applications such as in cutting tools, in structural materials and in heat sink materials because of its good thermal conductivity and superior hardness surpassed only by diamond. A cBN sintered compact not containing any binder material is particularly promising in that the excellent properties on the cBN compact are not impaired by the presence of a binding material.

Various methods have been proposed to produce a binder-free cBN compact. For example, a reactive sintering process is disclosed in Japanese Laying-Open Gazette No. 28,782/1985.

A number of proposals have also been made recently for bonding a cBN compact to metals or metal alloys. One of the most commonly employed method is to bond the cBN compact and other metallic material together using a suitable solder applied at the bonding interface thereof. This method is carried out with solder materials based on Au or Ag such as Au—Ta, Au—Nb, Ag—Ti, and Ag—Cu—Ti are known and used, see, for example, Japanese Laying-Open Gazette No. 134,665/1984. Using a suitable solder material, the bonding of the cBN compact to a body of metal or metal alloy is performed in an inert atmosphere or in a vacuum at elevated temperatures above 800° C. Therefore, for the successful solder bonding of the cBN compact, it is required that the cBN compact remains thermally stable at least up to a temperature of 800° C. On the other hand, in the binder-free cBN compact made by the reactive sintering process, a catalyst such as magnesium boron nitride which has been added to hexagonal boron nitride, inevitably remains in small amounts in the cBN compact as a impurity component. This impurity residue has an adverse effect on the cBN compact by significantly impairing its thermal stability. While a cBN compact made by using ceramics or a metal or metals as the binder, is thermally stable at temperatures around 800°-900° C., the cBN compact produced by the reactive sintering technique exhibits appreciable degradation of its properties such as thermal conductivity and hardness at temperatures over 750° C. because fine cracks or fissures are caused in cBN crystal grain boundaries at the elevated temperatures. It is believed that the fine cracks are produced by the great thermal stress generated within the cBN compact during heating due to a substantial difference in thermal expansion between the cBN and the residual magnesium boron nitride.

Accordingly, if it is desired to solder bond such a reactive sintered cBN compact, a soldering temperature of less than 750° C should be used. Also, when the cBN compact is utilized as the structural material, it is subject to a maximum temperature of between 500°-600° C., making it necessary to employ a soldering material which does not melt out at the specified temperatures. It is, therefore, desired to provide a solder which has a soldering temperatures of 650°-750° C., preferably around 700° C. when a melting point is 640°-740° C., and yet is capable of firmly bonding the reactive sintered cBN compact.

Conventionally, Sn containing solders such as Cu-Sn-Ti have been proposed, see, for example, Japanese Laying-Open Gazette No. 136,605/1986. Because of their relatively lower soldering temperatures, the metal component e.g. Ti in the solder which imparts a bonding capacity to the cBN compact, does not enter into a sufficient reaction with the cBN compact, resulting in a poor bonding strength. Besides, such metallic components in the solder tend to be readily oxidized. In order to prevent the solder component from being oxidized during soldering, special care must be taken. For example, soldering must be conducted in a high vacuum of $10^{-3}$ torr or in an ambient of high purity inert gas, or using a suitable oxide getter.

SUMMARY OF THE INVENTION

Accordingly, it is an object of the invention to provide a method for joining a cubic boron nitride sintered compact to a body of different material, and more particularly to a novel method of joining a cubic boron nitride sintered compact to a body of different material with higher bonding strength at temperatures below 750° C where an oxidation of the bonding including Ti and deterioration of the cBN sintered compact are avoided.

It is another object of the invention to provide a method for joining one cubic boron nitride sintered compact to another cubic boron nitride sintered compact with a higher bonding strength at temperatures below 750° C. where oxidation of the bonding inducing Ti and deterioration of the cBN sintered compacts are avoided.

It is still another object of the invention to provide a method for joining a cubic boron nitride sintered compact to a body of shank material with high bonding strength at temperatures below 750° C. where oxidation of the bonding inducing Ti and deterioration of the cBN sintered compact are avoided.

It is still another object of the invention to provide a method suitable for bonding a body of cubic boron nitride based material such as a polycrystalline sintered compact produced by sintering cubic boron nitride having an addition of binder material, and a polycrystalline cubic boron nitride sintered compact having substantially no binding phase, to a body of a different material.

In a method for bonding the cBN sintered compact according to one aspect of the invention, a pair of cBN sintered compacts, each having a bonding surface, are prepared. A Ti layer having a thickness of 0.01-1 μm is developed on the bonding surface of each cBN compact, followed by the formation of a Ni layer having a thickness of 0.01-5 μm over the Ti layer. The two cBN sintered compacts are put together with a 10-1,000 μm metal foil of Al or Al-Ni alloy being interposed between the bonding surfaces of the cBN compacts. The cBN compacts thus assembled are then subjected to a heat treatment at a temperature above the melting point of the metal foil and not exceeding 750° C. in a vacuum or in a inert atmosphere.

According to another aspect of the invention, a pair of cBN sintered compacts, each having a bonding surface are prepared. A Ti layer is formed on the bonding surface of each cBN compact to a thickness of 0.01-1 μm, followed by the formation of a Cu layer to a thickness of 0,01-5 μm on the Ti layer. The pair of cBN compacts are held together with a 10-1,000 μm metal foil of an ·Ag-Cu-In alloy being placed between the bonding surfaces of the cBN compacts. The cBN compacts thus assembled are then heated up to a temperature above the melting point of the alloy and not exceeding 750° C. in a vacuum or in an inert atmosphere.

According to still another object of the invention, a cubic boron nitride sintered compact having a bonding face and a body of shank material are prepared. A Ti layer is formed on the bonding surface of the cBN compact to a thickness of 0.01-1 μm, followed by the formation of a Ni layer to a thickness of 0.01-5 μm on the Ti layer. The cBN compact and the body of shank material are put together with a 10-1,000 μm metal foil of Al or Al-Ni alloy containing 90 % by weight or more of Al being interposed between the cBN compact and the body of shank material. The cBN compact structure is then heated up to a temperature above the melting point of the metal foil and not exceeding 750° C. in a vacuum or in an inert atmosphere.

DETAILED DESCRIPTION OF THE INVENTION

Cubic boron nitride sintered compacts that can be suitably bonded according to a method of this invention, include a polycrystalline sintered compact made by sintering cubic boron nitride mixed with an amount of a binding material, and a polycrystalline cubic boron nitride sintered compact having a very small binding phase.

When a cBN sintered compact is to be bonded to another cBN sintered compact or to a body of different material, thin layers of Ti and Ni or Cu are successively formed on the bonding surface or bonding interface of the cBN sintered compact by means of sputtering or ion plating techniques. The Ti layer is preferably deposited to a thickness of 0.01-1 μm. The Ti layer having a thickness of less than 0.01 μm cannot undergo a sufficient bonding reaction with the cBN sintered compact, resulting in poor bonding. The Ti layer having a thickness over 1 μm tends to retard the catalytic action of an intermediate material such as Al, Al—Ni and Ag—Cu—In to be applied on the bonding interface in the form a thin film. A sufficient catalytic action by the intermediate material also results in a poor bonding.

On the other hand, the Ni should preferably have a thickness of 0.01-5 μm. A Ni layer of less than 0.01 μm thickness fails to effectively prevent the oxidation of the Ti layer, while a Ni layer of more than 5 μm thickness cannot be melted well with a catalytic intermediate layer of Al, an Al—Ni alloy or an Ag—Cu—In alloy during bonding at elevated temperatures, thereby effecting only an insufficient catalytic action with respect to the Ti layer. The result here is also a poor bonding strength. This is also true of the Cu layer.

As briefly mentioned, a thin layer of Al, an Al—Ni alloy or an Ag-Cu—In alloy is used at the bonding interface as a catalytic intermediate layer for activating and promoting the bonding action that takes place at the interface between the Ti and the cBN sintered compact. The catalytic intermediate layer having a thickness less than 10 μm is too thin to exhibit a satisfactory catalytic action. At thickness over 1,000 μm, while the intermediate layer produces the desired effect of promoting the bonding at the interface, it gets more fragile and reducers the shear strength of the bonded cBN sintered compact structure. Accordingly, a thickness within the range of 10-1,000 μm should be utilized with respect to the catalytic intermediate layer.

As is known to those skilled in the art, pure aluminum has a melting point of approximately 660° C.. The melting point of an Al—Ni alloy varies with the Ni content in the alloy. With the Ni less than 10 % by weight, Al—Ni alloy has a melting point of 640-720° C.. By heating the bonding interface of the cBN sintered compact to elevated temperatures above the melting point of the Al or Al—Ni intermediate layer, both the intermediate layer and the Ni layer melt out to activate the catalize the bonding action between the Ti layer and the cBN compacts. The cBN compact sintered compacts are thus firmly joined together. Note that the heating of the bonding interface is performed in an inert atmosphere or in a vacuum to avoid the oxidation of Al or Ni. Since the Ti layer which is extremely susceptible to oxidation, is protected by the Ni layer, it is not necessary to use a high purity inert gas or an ultra high vacuum for the heating process. Neither is it necessary to introduce an oxygen getter.

The melting point of Ag—Cu—In alloy varies depending on its composition but it should be compatible with the maximum allowable temperature for the cBN compacts and the conditions under which the bonded cBN sintered compact structure is actually used. In this view, Ag—Cu—In alloy should possesses the melting point within the range of 600°-740° C.. As can be represented by the ternary diagram, it is desired that Ag—Cu—In alloy is composed of 15-25 % by weight of In, 23-35 % by weight of Cu and the balance of Ag. For example, a 52Ag—28Cu—20. In alloy exhibits a melting point of approximately 650° C.

If this ternary alloy is used in the form of a thin intermediate layer at the bonding interface between the cBN sintered compacts, heating of the compacts up to temperatures above the melting point of the alloy, fuses the intermediate layer and the Ni layer or the Cu layer into a molten state, by which the bonding action between Ti and the cBN sintered compacts is effectively activated. Upon the completion of the heat treatment, both cBN sintered compacts are firmly joined together. Heating of the sintered compacts should be carried out in an inert atmosphere or in a vacuum to prevent Ag, Cu and In from being oxidized. However, the Ti which is highly susceptible to oxidation, is protected by the Cu layer. Hence, there is no need to used the high purity inert gas and ultra high vacuum or an oxygen getter.

As described hereinabove, it is possible to bond one cBN sintered compact firmly to another cBN sintered compact or a body of shank material at temperatures in the neighborhood of 750° C. by forming on the entire bonding interface a layer of Ti which imparts an extremely high bonding ability to the cBN sintered compact and an intermediate layer of Al, Al—Ni alloy or Ag—Cu—In alloy which activates and promotes the bonding action between Ti and a cBN compact. In addition, the use of an oxidation resistant Ni layer or Cu layer on the Ti layer makes it possible for a cBN sintered compact to be joined firmly to another cBN sintered compact or to a body of a different material without causing the oxidation of Ti even in an atmosphere having a certain amount of oxygen.

Shank materials having a coefficient of thermal expansion closer to that of the cBN sintered compact are preferred for bonding with the cBN sintered compact. Examples of suitable shank materials are W alloy, Mo, W and cemented carbide.

In accordance with the invention, the cBN sintered compact can be bonded tightly to another cBN sintered compact or a body of shank material by heating up to temperatures lower than those employed for the conventional brazing solders. Thus, it is possible to join the cBN sintered compact, which is heat resistant up to approximately 750° C.., to another cBN sintered compact or a body of shank material without causing fine cracks under thermal stress in the cBN compact and without inviting any deterioration in physical and chemical properties of the cBN compact. In the past, cBN sintered compacts were used only in a limited range of applications in spite of its distinguished properties such as excellent hardness and good thermal conductivity, because the lack of thermal stability made the solder bonding of the cBN sintered compact extremely difficult. However, the present invention, by effectively solving the problems inherent in the prior art bonding process, makes it possible to use cBN sintered compacts in a wide variety of applications.

The invention itself as well as other objects, features, aspects and advantages of the present invention will become more apparent from the following detailed description of the present invention when taken in conjunction with the accompanying drawings.

BRIEF DESCRIPTION OF THE DRAWING

The single FIGURE is a perspective view of a bonding tool made in accordance with the method of this invention.

EXAMPLE 1

Two cBN sintered compacts made by the reactive sintering process and having a size of 2.5×2.5×1.5 mm were used. A layer of Ti was first deposited on the bonding surface of 2.5×2.5 mm of each of the cBN sintered compacts to a thickness of approximately 0.3 $\mu$m by means of sputtering. A layer of Ni was then grown in a similar way to a thickness of approximately 0.1 $\mu$m. The two cBN sintered compacts were put together with a 2.5×2.5×0.1 mm pure Al foil interposed between the bonding surfaces of the compacts. The cBN sintered compacts thus assembled were placed in a vacuum furnace. Within the furnace, a vacuum of $10^{-3}$ torr was produced by a vacuum pump. The cBN sintered compacts were heated up to 700° C. by raising the temperature within the furnace at a rate of 20° C. per minute. After heating at 700° C. for 10 minutes, the compacts were cooled down.

Upon the completion of the heat treatment, the cBN sintered compacts were found to have been firmly joined together with a bonding strength of 13 kg/mm$^2$. No degradation in the properties of the bonded compacts was found and their hardness and thermal conductivity was substantially the same as before the heat treatment.

EXAMPLE 2

Two cBN sintered compacts identical to those of example 1 were used. A 0.1 $\mu$m thick Ti layer and a 0.06 $\mu$m thick Ni layer were successively sputtered on the bonding surface of each cBN sintered compact. The two cBN sintered compacts were put together with a 2.5×2.5×0.1 mm foil of Al—Ni alloy being sandwiched between the bonding surfaces of the sintered compacts. The Al—Ni alloy comprised 96 % by weight of Al and 4 % by weight of Ni. The sintered compacts were then subject to a high-temperature treatment at 680° C. in a vacuum of $10^{-3}$ torr for a duration of 10 minutes in much the same way as in Example 1.

Upon the completion of the heat treatment, the cBN sintered compacts were found to have been firmly joined to each other with a boding strength of approximately 13 kg/mm$^2$, which was substantially the same value as in the example 1. No degradation of the bonded cBN sintered compacts was found.

EXAMPLE 3

A pair of cBN sintered compacts made by the reactive sintering process and having a three dimensional size of 2.5×2.5×1.5 mm were used. A Ti layer of about 0.3 $\mu$m in thickness and a Cu layer of about 0.05 $\mu$m thick were successively deposited on the 2.5×2.5 mm bonding surface of each of cBN compact by a sputtering technique. The two cBN compacts were held together with a 2.5×2.5×0.1 mm foil of 52Ag—28Cu—20In alloy placed between them. The compacts were then introduced into a vacuum furnace. While creating a vacuum $10^{-3}$ torr in the furnace by a vacuum pump, the temperature within the furnace was gradually raised up to 700° C. at a rate of 20° C. per minute. The cBN sintered compacts were heated at 700° C. for 10 minutes and then cooled down.

Upon the completion of the heat treatment, the cBN sintered compacts were firmly joined together with a bonding strength of 13 kg/mm$^2$. No deterioration was noticed in the bonded compacts and their hardness and thermal conductivity were much the same as before the heat treatment.

EXAMPLE 4

Two cBN sintered compacts similar to those used in example 3 were employed. A 0.1 $\mu$m thick Ti layer and a 0.1 $\mu$m Cu layer were successively sputtered on the bonding surfaces of the compacts, after which the compacts were held together with a 2.5×2.5×0.1 mm foil of 52Ag-25Cu-23In alloy being placed between them. The assembled compacts were then subjected to a heat treatment at 670° C. in a vacuum of $10^{-3}$ torr for 10 minutes as in Example 3.

Upon the completion of the heating cycle, the two cBN sintered compacts were firmly joined to each other showing a bonding strength of 13 kg/mm$^3$, which was approximately the same as in Example 3. Also, there was found no degradation of the qualities of the bonded cBN sintered compacts.

EXAMPLE 5

A cBN sintered compact produced by the reactive sintering process and having a three dimensional size of 2.5×2.5×1.5 mm and a W-10 % Cu alloy to be used as a shank material were employed. A layer of Ti was sputtered to a thickness of approximately 0.3 $\mu$m on the bonding face of the cBN sintered compact, followed by the sputtering of a Ni layer to a thickness of approximately 0.1 $\mu$m on the same bonding face. The cBN sintered compact and the body of the shank alloy were put together with a 2.5×2.5×0.1 mm foil of aluminum being interposed between them. The cBN compact and the shank alloy were next placed within the vacuum furnace where a vacuum of $10^{-3}$ torr was created by a vacuum pump and the temperature was gradually elevated up to 700° C. at the rate of 20° C. per minute. The cBN compact and the shank alloy were exposed to an elevated temperature of 700° C. for a 10 minutes and then cooled down.

The resulting structure is illustrated in the figure and showed that the cBN sintered compact 1 and the body 2 of the W-10 % Cu alloy were firmly joined together with a boding strength of 13 kg/mm$^2$. The cBN sintered compact did now show any deterioration of its qualities. Its hardness and thermal conductivity were substantially the same as before the heat treatment.

EXAMPLE 6

A cBN sintered compact and a body of a shank alloy of WC-5 % Co similar to those used in Example 5 were used. The bonding face of the cBN compact was sputter-coated with a 0.1 μm layer of Ti and then with a 0.06 μm layer of Ni. The cBN compact and the body of the shank alloy were put together with a 2.5×2.5×0.1 mm foil of an Al—Ni alloy being interposed between them. The Al—Ni alloy contained 96 wt.% of aluminum and 4 wt.% of nickel. The cBN compact and the body of the shank alloy were then heated at 680° C. in a vacuum of 10$^{-3}$ torr for 10 minutes in much the same way as in the Example 5.

After the heat treatment, the cBN sintered compact and the body of shank alloy were firmly joined together with a bonding strength of 13 kg/mm$^2$ which was comparable to that obtained in the other examples. No deterioration was noticed in the cBN sintered compact.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A method for bonding a cubic boron nitride sintered compact comprising the steps of:
    preparing a pair of cubic boron nitride sintered compacts, each having a bonding surface;
    forming a Ti layer of 0.01–1 μm in thickness on said bonding surface of each of said cubic boron nitride sintered compacts;
    forming a Ni layer of 0.01–5 μm in thickness over said Ti layer;
    holding said cubic boron nitride sintered compacts together, with a metal foil of 10–1,000 μm in thickness being interposed between said bonding surfaces of said sintered compacts, said metal foil being made of a material selected from the group consisting of aluminum and Al—Ni alloy; and
    heating said sintered compacts to a temperature above the melting point of said metal foil and not exceeding 750° C. in an inert atmosphere or in a vacuum.

2. The method for bonding a cubic boron nitride sintered compact according to claim 1, wherein said Al—Ni alloy comprises 90 % by weight or more of Al and the balance is Ni.

3. The method for bonding a cubic boron nitride sintered compact according to claim 2, wherein said cubic boron nitride sintered compact is heat-resistant up to a temperature of approximately 750° C..

4. The method for bonding of cubic boron nitride sintered compact according to claim 3, wherein said cubic boron nitride sintered compact is produced by a reactive sintering process.

5. An article of manufacture, comprising a pair of cubic boron nitride sintered compacts, each compact having a bonding surface; a permanent bond between said bonding surfaces of said compacts, said permanent bond comprising a Ti layer of 0.01–1 μm in thickness on said bonding surface of each of said cubic boron nitride sintered compacts; a Ni layer of 0.01–5 μm in thickness of said Ti layer; a metal foil of 10–1,000 μm in thickness interposed between said bonding surfaces of said sintered compacts, said metal foil being made of a material selected from the group consisting of aluminum and Al—Ni alloy; and wherein said metal foil forms said bond between said sintered cubic boron nitride compacts as a result of a heat treatment not exceeding 750° C. that melted said metal foil to form said permanent bond.

6. A method for bonding a cubic boron nitride sintered compact comprising the steps of:
    preparing a pair of cubic boron nitride sintered compacts, each having a bonding surface;
    forming a Ti layer of 0.01–1 μm in thickness on said bonding surface of each of said cubic boron nitride sintered compacts;
    forming a Cu layer of 0.01–5 μm in thickness on said Ti layer;
    holding together said cubic boron nitride sintered compacts, with a metal foil of Ag—Cu—In alloy having a thickness of 10–1,000 μm interposed between said bonding surfaces of said cubic boron nitride sintered compacts; and
    heating said cubic boron nitride sintered compacts to a temperature above the melting point of said Ag—Cu—In alloy and not exceeding 750° C. in an inert atmosphere or in a vacuum.

7. The method for bonding a cubic boron nitride sintered compact according to claim 6, wherein said Ag—Cu—In alloy is a ternary alloy comprising 15–25 % by weight of In, 25–35 % by weight is Cu and the balance of Ag.

8. The method for bonding a cubic boron nitride sintered compact according to claim 7, wherein said cubic boron nitride sintered compact is heat resistant up to a temperature of approximately 750° C..

9. The method for bonding a cubic boron nitride sintered compact according to claim 8, wherein said cubic boron nitride sintered compacts are produced by a reactive sintering process.

10. An article of manufacture, comprising a pair of cubic boron nitride sintered compacts, each compact having a bonding surface; a permanent bond between said bonding surfaces of said compacts, said permanent bond comprising a Ti layer of 0.01–1 μm in thickness on said bonding surface of each of said cubic boron nitride sintered compacts; a Cu layer of 0.01–5 μm in thickness on said Ti layer; a metal foil of an Ag—Cu—In alloy having a thickness of 10–1,000 μm interposed between said bonding surfaces of said cubic boron nitride sintered compacts; and wherein said metal foil of said Ag—Cu—In alloy forms said permanent bond between said sintered cubic boron nitride compacts as a result of a heat treatment not exceeding 750° C. that melted said metal foil to form said permanent bond.

11. A method for bonding a cubic boron nitride sintered compacts comprising the steps of:

preparing a cubic boron nitride sintered compact having a bonding surface, and preparing a body of shank material;

forming a Ti layer of 0.01–1 μm in thickness on said bonding surface of said cubic boron nitride sintered compact;

forming a Ni layer of 0.01–5 μm in thickness on said Ti layer;

holding together said cubic boron nitride sintered compact and said body of shank material, with a metal foil of Al—Ni alloy having a thickness of 10–1,000 μm being interposed between said cubic boron nitride sintered compact and said body of shank material, said metal foil being made of Al or Al—Ni alloy comprising 90 % by weight or more of Al and the balance is Ni; and heating said cubic boron nitride sintered compact and said body of shank material to a temperature above the melting point of said Al or said Al—Ni alloy and not exceeding 750° C. in an inert atmosphere or in a vacuum.

12. The method for bonding a cubic boron nitride sintered compact according to claim 11, wherein said shank material is a metal selected from a group of W alloy, Mo, W and cemented carbide.

13. The method for bonding a cubic boron nitride sintered compact according to claim 12, wherein said cubic boron nitride sintered compact is heat-resistant up to a temperature of approximately 750° C..

14. The method for bonding a cubic boron nitride sintered compact according to claim 13, wherein said cubic boron nitride sintered compact is produced by a reactive sintering process.

15. An aritcle of manufacture, comprising a cubic boron nitride sintered compact and a shank body of a shank material, said cubic boron nitride sintered compact having a bonding surface, said shank body having a bonding surface, a permanent bond between said sintered compact and said shank body, said permanent bond comprising a Ti layer of 0.01–1 μm in thickness on said bonding surface of said cubic boron nitride sintered compact; a Ni layer of 0.01–5 μm in thickness on said Ti layer; a metal foil of Al—Ni alloy having a thickness of 10–1,000 μm interposed between said cubic boron nitride sintered compact and said shank body, said metal foil being made of Al or Al—Ni alloy comprising 90% by weight or more of Al and the balance of Ni; and wherein said metal foil of Al or Al—Ni forms said permanent bond beteween said cubic boron nitride sintered compact and said shank body as a result of a heat treatment not exceeding 750° C. that melted said metal foil to form said permanent bond.

* * * * *

UNITED STATES PATENT AND TRADEMARK OFFICE
CERTIFICATE OF CORRECTION

PATENT NO. : 4,859,531

DATED : August 22, 1989

INVENTOR(S) : Kazuwo Tsuji; Hitoshi Sumiya; Yoshiaki Kumazawa; Nobuo Urakawa; Keiichi Satoh It is certified that error appears in the above-identified patent and that said Letters Patent is hereby corrected as shown below:

In [57] ABSTRACT: line 9, replace "0.01-5 µn" by --0.01-5 µm--;
line 13, replace "boding" by --bonding--;
line 15, replace "meeting" by --melting--.

In the Claims:

Claim 1, (Col. 7, line 46), replace "over" by --on--.

Claim 4, (Col. 7, line 67), replace "of" by --a--.

Claim 5, (Col. 8, line 11), replace "of" by --on--.

Claim 7, (Col. 8, line 41), replace "is" by --of--;
(Col. 8, line 42), replace "of" by --is--.

Claim 11, (Col. 8, line 68), replace "compacts" by --compact--.

Claim 15, (Col. 10, line 7), replace "aritcle" by --article--;
(Col. 10, line 23), replace "beteween" by --between--.

Signed and Sealed this

Twenty-first Day of August, 1990

*Attest:*

HARRY F. MANBECK, JR.

*Attesting Officer*   *Commissioner of Patents and Trademarks*